United States Patent [19]
Lamers

[11] Patent Number: 5,890,987
[45] Date of Patent: Apr. 6, 1999

[54] CONTINUOUSLY VARIABLE TRANSMISSION

[75] Inventor: Hendrikus Franciscus Lamers, Goirle, Netherlands

[73] Assignee: Van Doorne's Transmissie B.V., Tilburg, Netherlands

[21] Appl. No.: 791,772

[22] Filed: Jan. 29, 1997

[30] Foreign Application Priority Data

Feb. 5, 1996 [NL] Netherlands .......................... 1002245

[51] Int. Cl.⁶ ................................................. F16H 47/06
[52] U.S. Cl. ........................... 475/210; 475/127; 474/28
[58] Field of Search ................................... 475/116, 127, 475/210, 211, 212; 477/45, 39; 474/11, 18, 28

[56] References Cited

U.S. PATENT DOCUMENTS

| | | | |
|---|---|---|---|
| 4,402,237 | 9/1983 | Tomlinson | 475/211 X |
| 4,706,518 | 11/1987 | Moroto et al. | 475/210 |
| 4,864,889 | 9/1989 | Sakakibara et al. | 475/211 |
| 5,052,247 | 10/1991 | Kato et al. | 477/46 X |
| 5,112,283 | 5/1992 | Miyata et al. | 475/211 |
| 5,119,698 | 6/1992 | Sugaya et al. | 477/39 X |
| 5,169,366 | 12/1992 | Reniers | 477/45 X |
| 5,201,691 | 4/1993 | Doyle | 475/210 X |
| 5,643,131 | 7/1997 | Kuhn et al. | 475/210 |
| 5,669,846 | 9/1997 | Moroto et al. | 477/45 X |
| 5,720,691 | 2/1998 | Ogawa et al. | 474/28 X |

*Primary Examiner*—Dirk Wright
*Assistant Examiner*—Peter T. Kwon
*Attorney, Agent, or Firm*—Young & Thompson

[57] ABSTRACT

Continuously variable transmission, for a motor vehicle, provided with a primary pulley with an input pulley shaft, a secondary pulley with an output pulley shaft, a drive belt positioned around the primary and secondary pulleys and a transmission mechanism which is constructed in combination with a direct/neutral/reverse group and is positioned after the secondary pulley and has at least two adjustable transmission ratios for forward drive. The primary pulley with input pulley shaft and the secondary pulley with output pulley shaft are each coupled via a gear group to, respectively, an input transmission shaft and an output transmission shaft. The two transmission shafts essentially lie in the extension of one another and the two pulleys are located on either side of the axis line of the two transmission shafts. A hydraulic control circuit is installed which has at least a primary and a secondary control valve for controlling the pressures for the primary and the secondary pulley respectively. The transmission mechanism has at least two clutches for the forward drive and a clutch for the reverse drive. The hydraulic control circuit furthermore has two control valves for adjusting the said forward clutches.

8 Claims, 4 Drawing Sheets

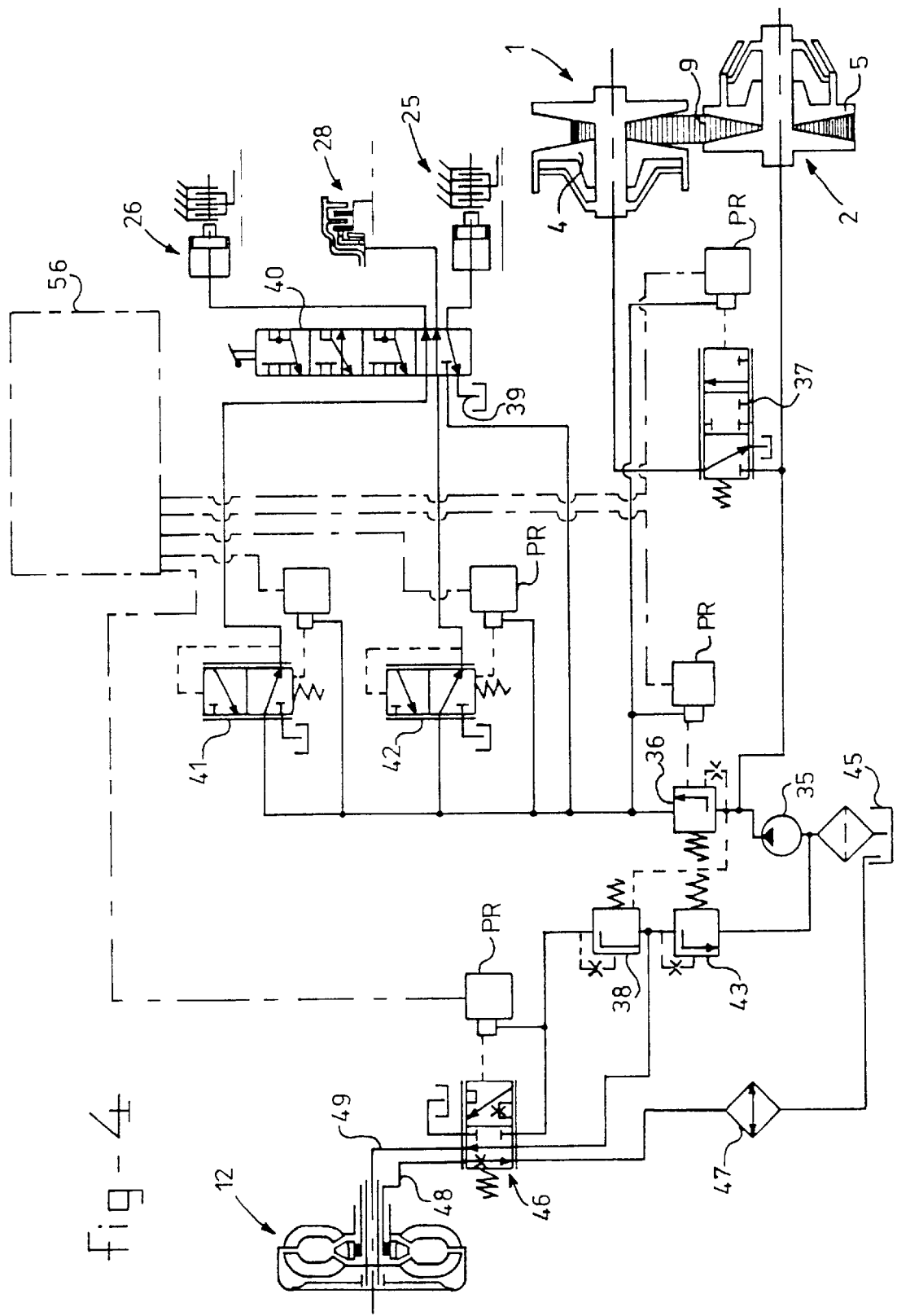

CONTINUOUSLY VARIABLE TRANSMISSION

BACKGROUND OF THE INVENTION

1. Field of the Invention

The invention relates to a continuously variable transmission, in particular for a motor vehicle, at least provided with a primary pulley with an input pulley shaft, a secondary pulley with an output pulley shaft, a drive belt positioned around the primary and secondary pulleys and a transmission mechanism which is constructed in combination with a direct/neutral/reverse group and is positioned after the secondary pulley and has at least two adjustable transmission ratios for forward drive.

2. Description of the Related Art

A transmission of this type is known and is used in particular for motor vehicles. With a transmission of this type the radial position of the drive belt between the primary and secondary pulleys can be varied, the relationship between the two radial positions of the drive belt in the pulleys determining the transmission ratio. With this arrangement the range of possible transmission ratios is determined by the radial dimension of the pulleys and by the strength and durability of the drive belt. In general as large as possible a range for the transmission ratios is desired when the transmission is used in motor vehicles. To this end a transmission of this type can also be provided with a separate transmission mechanism having at least two adjustable transmission ratios. In this way a transmission range of the drive belt/pulley combination, which in itself is limited because of the limited dimensions thereof, can be increased by combining this with the at least two adjustable transmission ratios of the transmission mechanism. In this way a continuously variable transmission with a relatively large transmission range is obtained in practice.

With this arrangement the transmission mechanism is mounted in the drive direction after the secondary pulley; the adjustable transmission ratio of the transmission mechanism (output revs:input revs) can advantageously be greater than one in order to prevent high drive belt revs, or can advantageously be less than one in order specifically to obtain high drive belt revs. A transmission mechanism of this type is provided with clutches which are adjustable, so that the desired transmission ratio of the transmission mechanism is adjustable.

In practice the said transmission mechanism is frequently constructed in combination with a DNR group (for adjustment of direct, neutral or reverse drive).

Nevertheless, in practice it has been found that, partly as a result of the installation of the requisite hydraulic control circuit, a combination of this type is relatively large, both in the radial and in the axial direction. In particular in the case of motor vehicles with rear wheel drive, this is a disadvantage because only a limited radial installation space is available in such vehicles.

SUMMARY OF THE INVENTION

The aim of the invention is to overcome the abovementioned problems and to provide a continuously variable transmission, in particular for rear wheel drive of motor vehicles, which achieves an optimum transmission ratio, is of compact installation length, both radially and axially, and in which the hydraulic control circuit is incorporated in an efficient manner.

According to the invention this is achieved with a continuously variable transmission of the type mentioned in the preamble, in that the primary pulley with input pulley shaft and the secondary pulley with output pulley shaft are each coupled via a gear group to, respectively, an input transmission shaft and an output transmission shaft, wherein the two transmission shafts essentially lie in the extension of one another and the two pulleys are located on either side of the axis line of the two transmission shafts.

BRIEF DESCRIPTION OF THE DRAWINGS

The invention will be explained below with reference to a few drawings, in which

FIG. 4 shows, diagrammatically, a possible embodiment of the control system for the components of the transmission shown in FIG. 1.

DETAILED DESCRIPTION OF THE INVENTION

Figure 1:
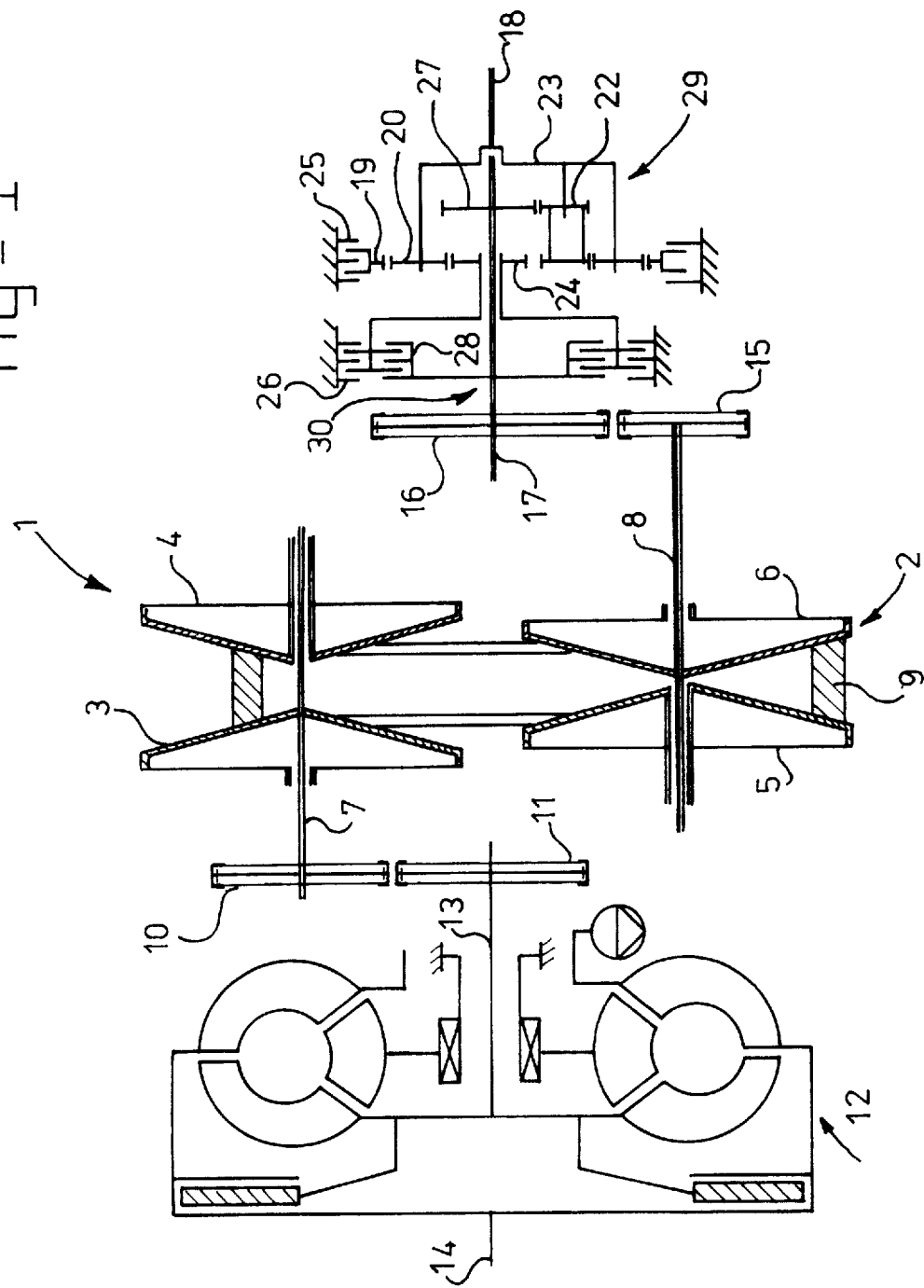
FIG. 1 shows, diagrammatically, an embodiment of a continuously variable transmission according to the invention.

The continuously variable transmission according to FIG. 1 comprises a primary pulley 1, the discs 3 and 4 of which are mounted on the pulley shaft 7, and a secondary pulley 2, the discs 5 and 6 of which are mounted on the pulley shaft 8. Disc 4 is axially displaceable over the pulley shaft 7 and disc 5 is axially displaceable over the pulley shaft 8. The radial position of the drive belt 9 in the pulleys 1 and 2 can be adjusted by an axial displacement of the discs 4 and 5. With this arrangement the relationship between the radial position of the drive belt in the secondary pulley 2 and the radial position of the drive belt 9 in the primary pulley 1 determines the transmission ratio. It will be clear that the total range of possible transmission ratios is partly dependent on the radial dimension of the primary pulley 1 and of the secondary pulley 2. In general, and in particular when the continuously variable transmission is used in vehicles, as large as possible a transmission range is desirable on the one hand. On the other hand, especially in the case of applications in motor vehicles, only a limited installation space is available for the transmission. This applies in particular in the case of rear wheel drive vehicles, especially in respect of the installation space in the radial direction. In the case of the transmission shown in FIG. 1, however, a relatively large transmission range can be obtained with a limited radial installation space, and therefore a limited size of the pulley discs.

The primary pulley shaft 7 is provided with a gear 10 which engages with a gear 11 on the output shaft 13 of a torque converter 12. Said torque converter 12 is connected by the input shaft 14 thereof to a drive unit, which is not shown, for example the engine of a motor vehicle.

The secondary pulley shaft 8 is provided with a gear 15 which engages with a gear 16 on the shaft 17. Said shaft 17 is part of the transmission mechanism 30 according to the invention, which also comprises a gear 27 and a clutch 28. As a result of the special spatial construction of the coupling of the pulley set 1, 2 on the input side by means of the gear set 10, 11 to the input transmission shaft 13 and on the output side by means of the gear set 15, 16 to the output transmission shaft 18, which is in the extension of the input transmission shaft, a restricted size in the radial direction is obtained.

The gear or sun wheel 27 engages with one or more first planet gears 22 of a DNR (direct/neutral/reverse) unit 29 and the clutch 28 can connect the sun wheel 24 of the DNR unit 29 to the shaft 17 of the transmission mechanism.

The DNR group 29 is used to adjust the direction of rotation of the output shaft 18 of the transmission in order to drive the vehicle forward (D), set it in neutral (N) or drive it in reverse (R). The DNR unit is a planetary gear train which, apart from the abovementioned first planet gear 22 and the sun wheel 24, comprises a second planet gear 20, a planet gear carrier 23 and an annulus gear 19. The sun wheel 24 can be locked to prevent rotation by means of a clutch 26 and the annulus gear 19 can be locked to prevent rotation by means of the clutch 25. The said clutches can each be a plate clutch. In this context the functioning of a planetary gear train is assumed to be known.

Figure 3:
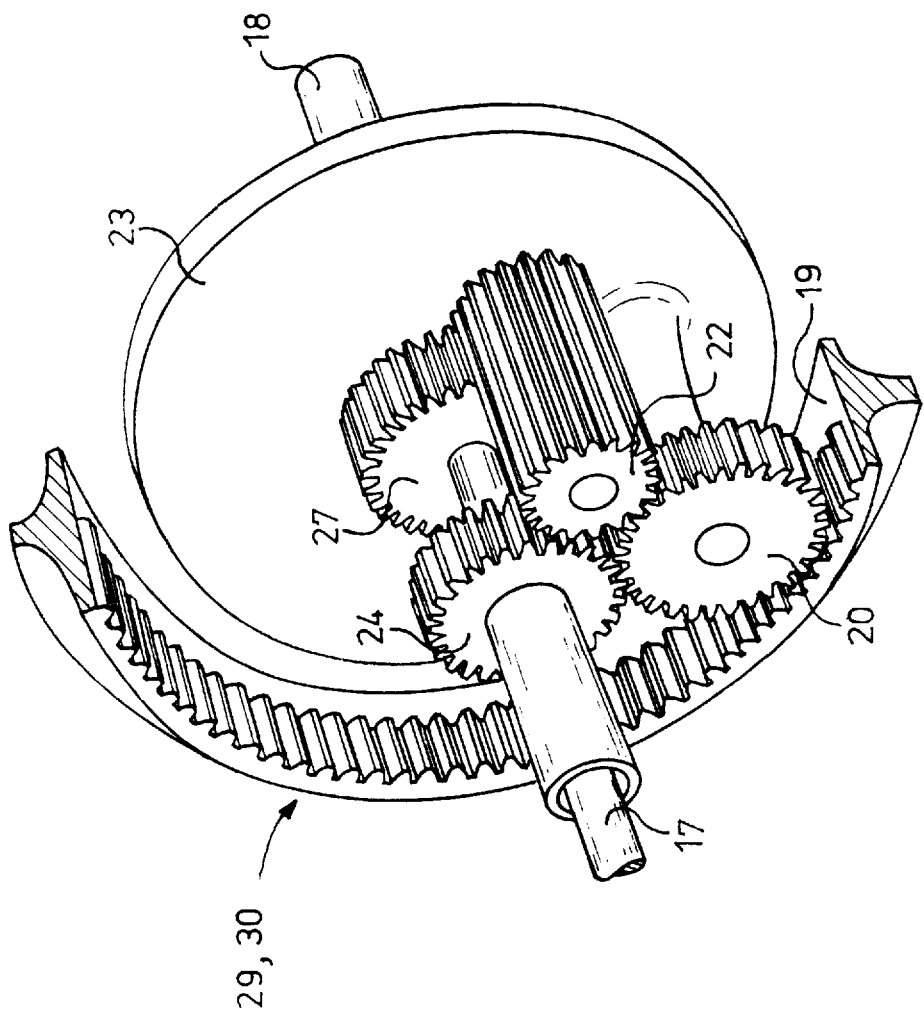
FIG. 3 shows a perspective view of a transmission mechanism according to FIG. 1 constructed in combination with a DNR group, without clutches being drawn.

The functioning of the transmission mechanism 30 in combination with the DNR group will be explained below with reference to FIGS. 1 and 3:

Neutral position
In this position the clutches 25, 26 and 28 are disengaged (i.e. not locked), such that no rotation is transmitted from the input shaft to the planet gear carrier 23 and the output shaft 18.

R position (reverse drive)
In this position the (reverse) clutch 25 is engaged and the clutches 26 and 28 are disengaged. The input rotation is transmitted via the sun wheel 27 and the first planet gear 22 to the second planet gear 20. Said gear will then unroll itself on the annulus gear 19. As a result the planet gear carrier 23 and the output shaft 18 rotate in a direction counter to that of the input shaft 17.

D position (forward drive)
In this position the (forward) clutch 28 is engaged and the clutches 25 and 26 are disengaged. As a result the sun wheel 27 and the sun wheel 24 are connected to one another. The first (long) planet gear 22 meshes with the sun wheel 27 and the second (short) planet gear 20, which meshes with the sun wheel 24. The consequence of this is that the planet gear carrier 23 and the output shaft 18 will start to rotate at the same revs (i.e. without deceleration (i.e. reduction) or acceleration) as shaft 17. The transmission ratio adjusted by means of the pulleys 1 and 2 with the drive belt 9 is consequently, with the exception of a possible reduction or acceleration at the gear group 15-16, transmitted unchanged through the transmission mechanism 30 and the DNR group 29.

The reduction position
In this position the clutch 26 is engaged and the clutches 25 and 28 are disengaged. The sun wheel 24 is then locked. As a result, the second planet gear rolls round the sun wheel 24 and the planet carrier 23 and the output shaft 18 will acquire lower or higher revs. Although the term reduction is used below, it is self-evident that both reduced and increased revs can be obtained by use of a transmission mechanism suitable for this purpose.

For given revs of the shaft 17, the revs obtained at the output shaft 18 in the reduction position will differ from those obtained in the D position. The use of both positions gives an increased range of transmission ratios.

Figure 2:
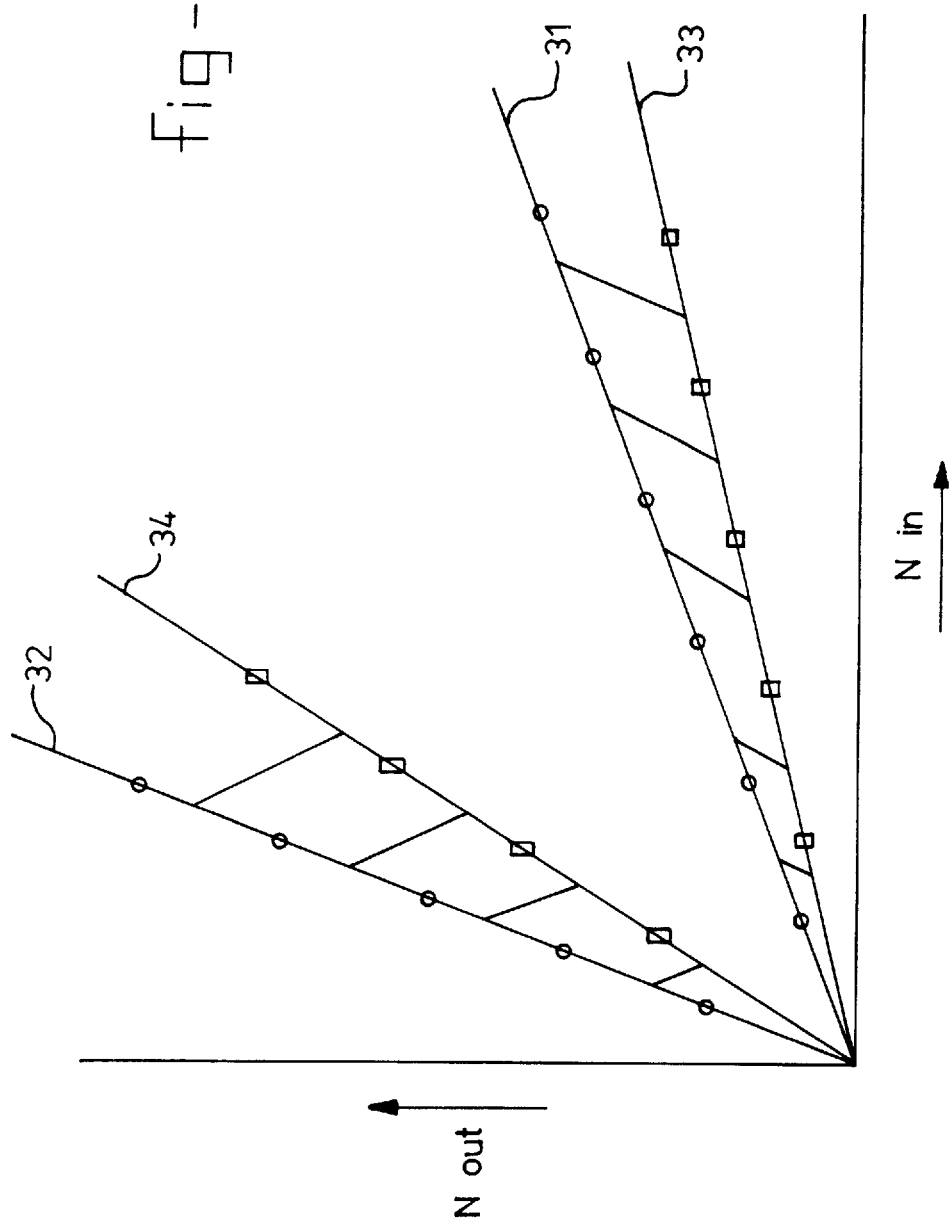
FIG. 2 shows a variogram of the transmission according to FIG. 1.

In this context reference is made to FIG. 2, in which this is shown. In the diagram the input revs $N_{in}$ of the primary pulley shaft 7 are plotted on the abscissa and the output revs $N_{out}$ of the output shaft 18 are plotted on the ordinate. Line 31 shows the lowest transmission ratio and line 32 the highest transmission ratio of the variator or pulley/belt combination 1, 2, 9 with the DNR group 29 in the D position. The region between lines 31 and 32 shows the range of possible transmission ratios. This range is essentially determined by the radial dimensions of the discs 3, 4, 5 and 6.

However, by use of the transmission mechanism 30 a reduction can be obtained and a new limit to the variogram is produced. In the reduction position, said limit is determined by line 33, which has the lowest transmission ratio, and line 34, which has the highest transmission ratio. The reducing effect of the gear 27 is responsible for this. By switching in a suitable manner between the D position and the reduction position, the entire region between the lines 32 and 33 can be utilised. It will be clear that the range of possible transmission ratios is appreciably increased as a result. In this way it is nevertheless possible with a compact transmission in the radial direction to obtain a relatively large range of possible transmission ratios. Incidentally, a relatively compact transmission in the axial direction is also obtained as a result of the construction used for the clutches amongst other components.

The said control range for the transmission can be doubled by the transmission mechanism in an extreme case if the two speeds of the mechanism differ by a value which is exactly the same as the range of the variator (or greater, although the transmission then does not have a continuous range of adjustment). If this is not the case, then, as is shown in FIG. 2, there is an overlap of the two variograms, each associated with one position of the transmission mechanism, and in the overlap region (region without hatching in FIG. 2) it is possible to select one of two operating points for the variator. In which context, of course, the best must be chosen on the basis of, for example, belt wear, transmission or engine efficiency, consumption, etc.

The clutches are preferably so controlled that it is simple to switch from the one position to the other position, automatically or by a driver. In the case of automatic control, said switching can be effected from a control unit on the basis of a large number of operating variables. In particular, the clutches can be controlled such that slip occurs in the clutches rather than between the pulleys 1, 2 and the belt 9. This prevents damage to the pulleys 1, 2 and the belt. It is known to allow this preferential slip per se to occur in the torque converter. However, allowing said slip to occur in the transmission mechanism instead of in the torque converter has the advantage that torque shocks originating from the road surface can already be absorbed before they reach the variator.

Instead of the reducing gear 27, it is also possible to use another, step-up configuration (i.e. with a higher transmission ratio greater than one and therefore higher output revs). The clutches 26 and 28 are positioned radially, in line in such a way that a compact transmission is obtained in the axial direction as well.

It is highly advantageous to site the transmission mechanism after the variator; specifically
    the engine torque is transmitted directly (without amplification) through the variator and only then passes through the transmission mechanism, which, in the reduction position, does lower the revs but increases the torque. In other words, the range of the torque fed into the variator is smaller if the reduction takes place after the variator. If the transmission mechanism were to be sited before the variator, the variator would therefore have to transmit a higher torque, which is associated with high pinching forces and consequently also greater losses, the presence of a clutch between the wheels and the variator is advantageous
   a) in the event of an emergency stop, because the variator is still able to rotate even when the wheels are stationary and it is therefore possible to change down. Normally, the variator will not change down rapidly enough before the vehicle has come to a standstill and it is therefore necessary to drive off in a high gear instead of in low gear,
   b) when towing the car, because the variator can then be stationary, that is to say disengaged from the wheels. Normally the variator rotates together with the wheels and during towing a situation can arise in which no hydraulic pressure, and consequently also no pinching force, is available, with the result that the belt swings around as a result of centrifugal force and can become damaged.

These advantages are not achievable with the torque converter alone because the latter by definition has to be sited directly after the engine.

The hydraulic control system shown in FIG. 4 contains the elements needed to control the transmission shown in FIG. 1. In principle, the control system consists of three groups, namely: 1) the control for adjustment of the pulleys 1 and 2; 2) the control for the clutches 25, 26 and 28 in the combined transmission and DNR group; and 3) the control for lock-up of the torque converter 12.

1. The control for adjustment of the pulleys 1 and 2.

The flow produced by the pump 35 is adjusted by means of the so-called secondary control valve 36 to the desired secondary or line pressure. Said secondary pressure is applied to the displaceable disc 5 of the secondary pulley 2 and determines the clamping force exerted on the drive belt 9. Starting from the said secondary pressure, a primary pressure is then set with the aid of the primary control valve 37. Said primary pressure is applied to the displaceable disc 4 of the primary pulley 1 and determines the radial position of the drive belt 9 in the two pulleys and, consequently, also the transmission ratio (ratio i) between the primary and secondary shafts 7, 8.

2. The control for the clutches 25, 26 and 28 in the combined transmission and DNR group.

Starting from the said secondary pressure a desired auxiliary pressure at which the clutches 25, 26 and 28 can be engaged or disengaged is set with the aid of the auxiliary control valve 38. The clutches can be disengaged by connecting them to the exhaust 39 which, in itself, is connected to sump 45. Four operating positions (park, reverse, neutral and drive) can be selected for the transmission by means of the valve 40, which can be actuated via the manual gear lever.

In the neutral and park positions the three said clutches are connected to the exhaust 39 and are thus disengaged.

In the reverse position the reverse clutch 25 is engaged under the influence of the auxiliary pressure, whilst the forward clutches 26 and 28 are disengaged.

In the (shown) drive position of the valve 40, the reverse clutch 25 is connected to the exhaust 39. At the same time one of the two forward clutches can be engaged (connected to the auxiliary pressure) and the other clutch can be disengaged (i.e. connected to the exhaust 39) with the aid of the control valves 41 and 42, or vice versa. The various features are such that either the abovementioned D position is engaged by means of valve 42 or the said reduction position is engaged by means of valve 41.

The individual control valves 41 and 42, which are each controlled by a pressure regulator PR, for the two forward clutches make it possible (partially) to actuate said clutches 26, 28 at the same time. As a result changing between the two transmission ratios of the transmission mechanism can take place fluently and under torque. It is also possible to construct the two valves as a single valve with a single pressure regulator, which, however, results in a somewhat abrupt changeover action and less fluent gear changing being obtained.

3. The control for lock-up of the torque converter 12.

Valve 46 for the cooler/lock-up regulates the operating status of the torque converter with the aid of the auxiliary pressure and the lubricating pressure, said lubricating pressure being derived from the outlet from the secondary valve 36 by means of the lubricating pressure control valve 43. The cooler/lock-up valve 46 is an on/off valve which determines whether the cooler 47, which provides cooling for the hydraulic medium, is connected to the torque converter 12 (position drawn); because if the torque converter is disengaged a lot of energy is dissipated and cooling is needed; or
   to the remainder of the hydraulic circuit.

If the pressure in line 49 is higher than the pressure in line 48, the torque converter functions. In the other case, when the pressure in line 49 is lower than the pressure in line 48, the torque converter is switched to the lock-up position. This is the position drawn, the pressure in line 48 being equal to the auxiliary pressure and the pressure in line 49 being the exhaust pressure connected to the sump 45.

In normal operation, the valves 36, 37; 41, 42 are operated electronically, that is to say set with the aid of the associated pressure regulators PR (44). Said pressure regulators are connected to and are controlled by a central control unit 56, to which the operating variables of the transmission and of the motor vehicle are fed. Thus, one of said variables can be the current transmission ratio of the drive belt/pulley set.

From the standpoint of comfort and transmission efficiency, changing between the two transmission ratios of the transmission mechanism must take place quickly but nevertheless fluently. To this end both the engine speed and the vehicle speed must, in principle, be constant during changing. This can be achieved by means of an electronic control system which actuates the said control valves in a manner such that said valves are attuned to one another.

The invention claimed is:

1. Continuously variable transmission, in particular for a motor vehicle, comprising:
   a primary pulley with an input pulley shaft,
   a secondary pulley with an output pulley shaft,
   a drive belt positioned around the primary and secondary pulleys, and
   a transmission mechanism which is constructed in combination with a direct/neutral/reverse group and is positioned after the secondary pulley and has at least two adjustable transmission ratios for forward drive,
   wherein the primary pulley with input pulley shaft and the secondary pulley with output pulley shaft are each coupled via a gear group to, respectively, an input transmission shaft and an output transmission shaft, wherein the two transmission shafts are essentially coaxial with one another, axes of the two transmission shafts being disposed between rotational axes of the two pulleys.

2. Continuously variable transmission according to claim 1, further comprising a hydraulic control circuit containing at least one primary and one secondary control valve for control of primary and secondary pressures for, respectively, the primary and the secondary pulleys, wherein the transmission mechanism comprises at least two clutches for the forward drive and one clutch for reverse drive, and wherein the hydraulic control circuit further comprises two control valves for adjustment of the forward clutches.

3. Continuously variable transmission according to claim 2, wherein the two forward clutches are constructed as plate clutches and are positioned radially in line.

4. Continuously variable transmission according to claim 2, further comprising a valve essentially between the clutches of the transmission mechanism and the forward control valves, the valve being adjustable by means of a manual operating lever.

5. Continuously variable transmission according to claim 4, wherein the hydraulic control circuit contains an auxiliary control valve for adjusting the secondary pressure to an auxiliary pressure, which is fed, both via the two control valves of the transmission mechanism and directly, to the manual valve for the said clutches.

6. Continuously variable transmission according to claim 4, wherein the control valves (41, 42) of the transmission mechanism are combined in a single control valve.

7. Continuously variable transmission according to claim 2, wherein the said control valves are each adjusted by a pressure regulator (PR) and wherein the pressure regulators are controlled by a central control unit.

8. Continuously variable transmission according to claim 7, wherein the pressure regulators of the control valves of the transmission mechanism and the pressure regulators of the primary and secondary control valves are controlled such that the forward clutch slips before the drive belt between the pulleys slips.

* * * * *